(12) United States Patent
Nauroy et al.

(10) Patent No.: US 8,408,919 B2
(45) Date of Patent: Apr. 2, 2013

(54) SIMULATION DEVICE FOR TRACKING THE RESPECTIVE MOTIONS OF AT LEAST TWO INSTRUMENTS

(75) Inventors: Hervé Nauroy, Bienne (CH); Mirko Favre, Cully (CH); Jurjen Zoethout, Payerne (CH)

(73) Assignee: Xitact S.A., Morges (CH)

( * ) Notice: Subject to any disclaimer, the term of this patent is extended or adjusted under 35 U.S.C. 154(b) by 718 days.

(21) Appl. No.: 12/517,189

(22) PCT Filed: Nov. 20, 2007
(Under 37 CFR 1.47)

(86) PCT No.: PCT/EP2007/062554
§ 371 (c)(1),
(2), (4) Date: Nov. 20, 2009

(87) PCT Pub. No.: WO2008/065023
PCT Pub. Date: Jun. 5, 2008

(65) Prior Publication Data
US 2010/0178642 A1    Jul. 15, 2010

(30) Foreign Application Priority Data

Dec. 1, 2006    (EP) .................................. 06125261

(51) Int. Cl.
*G09B 23/28*    (2006.01)
(52) U.S. Cl. ........................................ 434/262; 434/272
(58) Field of Classification Search .......... 434/262–275; 600/101, 219
See application file for complete search history.

(56) References Cited

U.S. PATENT DOCUMENTS 5,800,178 A    9/1998  Gillio

FOREIGN PATENT DOCUMENTS

| EP | 1 517 119 | 3/2005 |
| EP | 1 574 825 | 9/2005 |
| EP | 1 575 015 | 9/2005 |
| WO | WO 99/39317 | 8/1999 |
| WO | WO 2004/051604 | 6/2004 |
| WO | WO 2005/090921 | 9/2005 |
| WO | WO 2005/091253 | 9/2005 |

OTHER PUBLICATIONS

International Search Report, mailed Apr. 18, 2008, from the European Patent Office for International Application No. PCT/EP2007/062554 (3 pages).

*Primary Examiner* — Timothy A Musselman
(74) *Attorney, Agent, or Firm* — Finnegan, Henderson, Farabow, Garrett & Dunner, LLP

(57) ABSTRACT

A simulation device is disclosed for practicing manipulations of at least one elongated medical instrument, comprising a housing presenting at least one instrument input and enclosing a first motion sensor for tracking the motions of a first elongated medical instrument inserted therein. The housing encloses a bifurcating device having one input connected to the instrument input as well as at least a first and a second outputs. The bifurcating device further comprises a deflecting mechanism for guiding the first and a second elongated medical instruments from its input, respectively, through the first and second outputs, the first output being connected to the first motion sensor while the second output is connected to a second motion sensor for tracking the motions of the second elongated medical instrument. Thus, the operator's feelings are very close from those of a real medical intervention, the respective behaviour of the instruments being substantially identical.

20 Claims, 3 Drawing Sheets

SIMULATION DEVICE FOR TRACKING THE RESPECTIVE MOTIONS OF AT LEAST TWO INSTRUMENTS

This application is a national stage filing under 35 U.S.C. §371 of International Application No. PCT/EP2007/062554, filed Nov. 20, 2007, which claims the benefit of priority from European Patent Application No. 06125261.5, filed Dec. 1, 2006, the entire contents of both of which are incorporated herein by reference.

TECHNICAL FIELD

The present invention relates to the field of simulations for medical training, more particularly to a simulation device, for practicing manipulations of at least one elongated medical instrument to perform minimally invasive medical interventions. The present invention relates more specifically to the simulation of cardiovascular, endovascular, interventional neuroradiology or diagnostic procedures. Among other features, the device comprises a housing presenting at least one instrument input and enclosing a first motion sensor for tracking the motions of a first elongated medical instrument inserted therein.

BACKGROUND ART

The demand for minimally invasive medical interventions, where instruments are inserted through the skin into the patient body under various kinds of guidance or visualization (X-ray, ultrasound, or other means of visualizing or identifying the position of the instruments), is growing fast and so does the need for trained persons able to carry out such interventions with a high level of security for the patient Many documents in the prior art disclose simulation devices for training physicians to the corresponding techniques, such devices being usually combined with virtual environment display systems and force feedback systems, arranged to act on the medical instrument on the basis of a motion information provided by the motion sensor. An example of such a device is disclosed in international patent application published under WO/2005/091253 in the name of the Applicant.

The complexity of these minimally invasive interventions grows also, now regularly requiring insertion of several different instruments within a single intervention in the patient body. Further to those instruments, the physicians may have to handle a syringe for contrast injection, an indeflator with a manometer in case an inflatable balloon is to be used during the intervention, as well as at least a first pedal to control operation of an X-ray emitter and a second pedal to start or stop recording the intervention.

Some of the known simulation devices provide solutions to allow physicians to train their skill in manipulating several medical instruments at the same time. An example of such a simulation device is disclosed in patent publication EP 1 576 566 A1, filed in the name of Mentice A B. This device discloses insertion of several instruments within separate instrument inputs of its housing and, further allows tracking of several instruments inserted within a same instrument input of the device, by provision of a number of carriages regularly spaced apart along a direction going away from an entry port of the device and, each of which is associated to one instrument to track the motions of the latter.

However, all the instruments inserted in this device are, either movable completely independently from each other in the case of separate inputs, or guided within a same channel until they are successively clamped in respective spaced carriages in case they are inserted within one single housing input. This last structure is well adapted for implementation of an intervention in which the instruments are all arranged concentrically to each other. In the case of instruments which are to be guided independently from each other, this device raises some interference issues inasmuch as, in a real intervention, the instruments may be separated from each other at an early stage of the intervention, while they would remain in a same channel in the simulation device. In other words, the different instruments travel through a common path in the device which is longer than it would be in a real intervention.

On the contrary, in case the instruments are inserted in separate inputs, there is no interference at all which neither corresponds to a real situation.

Consequently, a need exists, to improve the known simulation devices, for devices in which the instruments may follow separate paths according to a corresponding real intervention procedure. Such devices should have one entry port into which several instruments may be inserted simultaneously so that the handling and manipulating conditions are as real as possible for the physician.

SUMMARY.

The disclosed embodiments provide a simulation device, for training medical persons, in which several elongated instruments may be inserted by a user at the same time, some of which being inserted within a same entry port of the simulation device, while the feelings provided to the user remain as real as possible by limiting interferences between the instruments in reference to those existing in the above-mentioned devices.

To that end, embodiments of the present invention include in particular a simulation device as described above, in which the housing encloses a bifurcating device having one input connected to the instrument input as well as at least a first and a second outputs. This bifurcating device may further comprise a deflecting mechanism for guiding a first and a second elongated medical instruments from its input respectively through the first and second outputs. The first output may be connected to the first motion sensor while the second output may be connected to a second motion sensor for tracking the motions of the second elongated medical instrument when such is inserted in the simulation device.

By virtue of these features, two or more instruments may be inserted in the simulation device through its instrument input and share a common path to the bifurcating device after which they would follow separate paths. Such a configuration corresponds to that of a real intervention when a plurality of instruments is inserted in a patient body through one single catheter.

Thus, the training conditions by using a simulation device according to the present invention are as real as possible with respect to real intervention conditions.

In one embodiment, the bifurcating device may include a plate defining an input channel dividing into at least two output channels in the region of the deflecting mechanism, the latter preferably comprising a tongue mounted on the plate so as to be able to pivot between at least a first and a second positions.

BRIEF DESCRIPTION OF THE DRAWINGS

Other characteristics and advantages of the present invention will become more clearly apparent on reading the following detailed description of a exemplary embodiment, given with reference to the appended drawings that are provided by way of non-limiting examples, and in which.

DETAILED DESCRIPTION

Figure 1:
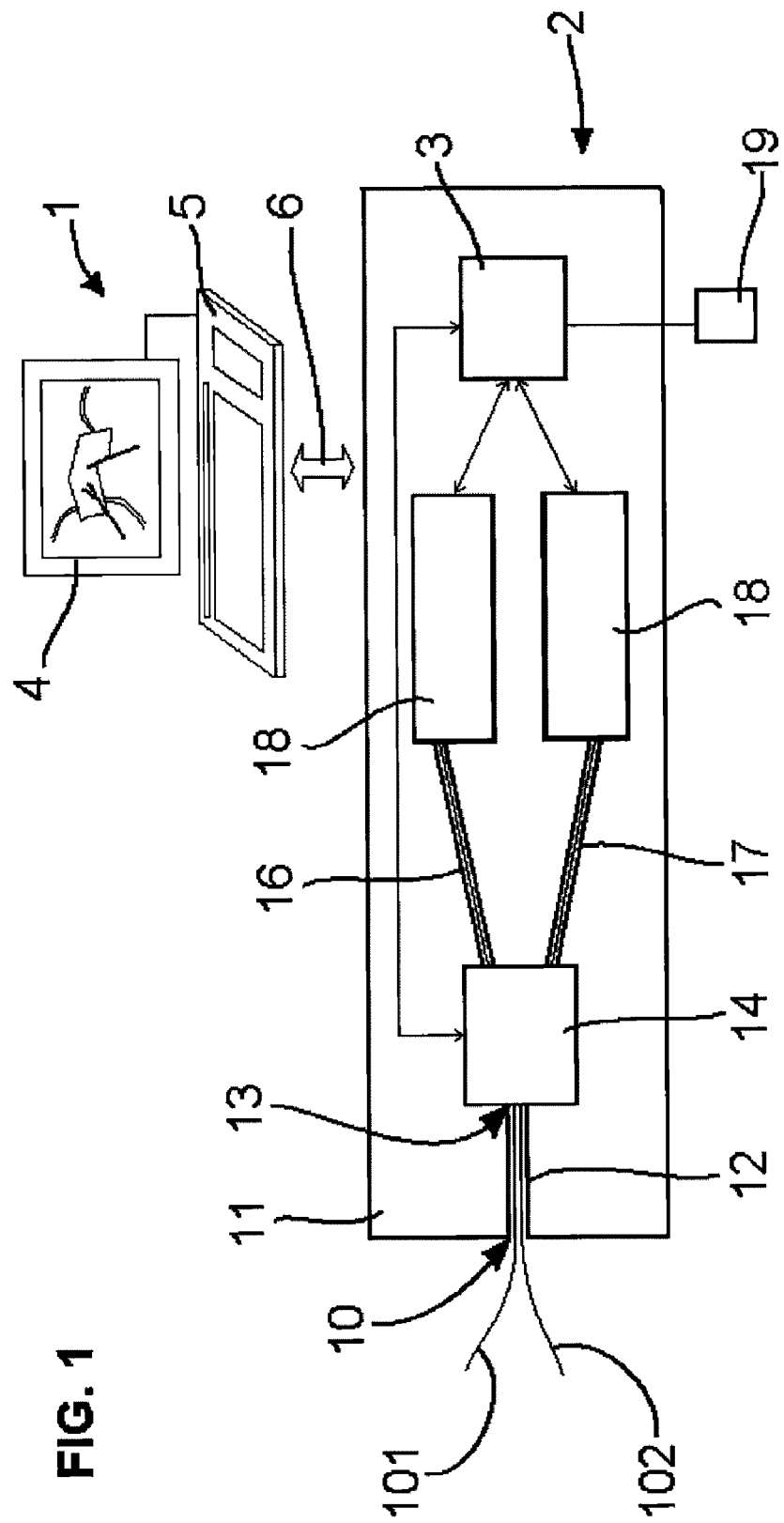
FIG. 1 is a schematic general view of a simulation system including a device according to a preferred embodiment of the present invention.

FIG. 1 shows a schematic general view of a simulation system including a device according to a preferred exemplary embodiment of the present invention.

It is important to note that different elements of the drawings are represented in different scales for a clarity purpose.

The simulation system may comprise a computer unit 1 associated with an interface or simulation device 2. The computer unit may be a conventional PC or similar, or alternatively be integrated with a processing unit or microcontroller 3 provided in the simulation device. Computer unit 1 may be connected with a display unit 4, and possibly with an input device 5, as already known from prior art. The simulation system may further comprise a communication interface 6 between computer unit 1 and simulation device 2, which may of any suitable known kind, either wired or wireless.

The purpose of the simulation system as schematically represented on FIG. 1 is to create a realistic tactile and visual environment for training of a minimally invasive medical or diagnostic procedure by use of at least one elongated medical instrument.

More particularly, according to the present invention, simulation device 2 may be designed to be able to handle two elongated medical instruments 101, 102 to be inserted in one single instrument input 10, the latter thus playing the role of a catheter and being arranged in a housing 11 of the simulation device.

While they are pushed into housing 11 through input 10, the two elongated medical instruments 101, 102 may share a common path 12 until they reach an input 13 of a bifurcating device 14. The latter may comprise a deflecting mechanism (15 on FIG. 2) arranged to separate the instruments from each other so that they follow different paths or channels 16, 17 when they are pushed further in the housing by an operator, through at least a first and a second outputs of the bifurcating device.

Each channel 16, 17 may guide the corresponding instrument to a simulation mechanism 18, conventionally comprising at least a motion sensor and preferably a force feedback generating mechanism acting on the instrument on the basis of a motion information provided by the motion sensor.

All the information and control instructions taking place between the motion sensor and the force feedback generating mechanism may be dealt with by microcontroller 3.

Further, an input device 19 may be provided in order to manually control the functioning state of bifurcating device 14.

Simulation mechanisms 18, including their motion sensors and their force feedback generating mechanisms, which may also be referred to as braking mechanisms, as well as microcontroller 3 and input device 19 may be of any suitable kind known from prior art.

For example, the motion sensors may be implemented as disclosed in WO 2005/090921 A1 or in EP 1 517 119 A1, both in the name of the Applicant. Regarding the (non-compulsory) force feedback generating mechanism, the one skilled in the art may consider the disclosure of WO 2005/091253 A2 for example, also in the name of the Applicant, which describes two braking mechanisms to provide haptic sensations.

Those elements will not be herein described any further as the simulation device according to the present invention is not limited thereby.

Figure 2:
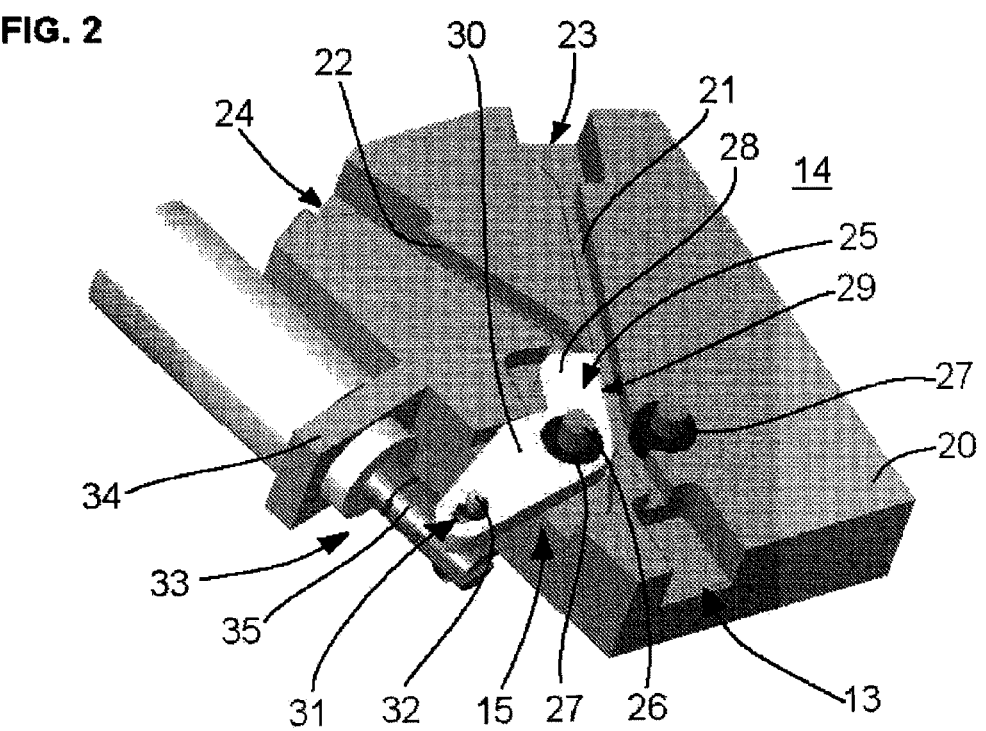
FIG. 2 is a perspective simplified view of a detail of the device of FIG. 1 according to a first preferred embodiment.

FIG. 2 represents a perspective simplified view of bifurcating device 14 according to a preferred exemplary embodiment of the present invention.

It may comprise a plate 20 in which may be designed input 13, as well as two output channels 21 and 22, each leading to an output port 23, 24 of the device. Plate 20 may be milled or moulded together with its ports and channels, or alternatively, may be etched to design the ports and channels, according to any suitable known manufacturing process. Obviously, plate 20 may be closed by a cover or any other suitable means in order to design closed paths for the elongated instruments.

Deflecting mechanism 15, here comprising a tongue 25, may be arranged to act on elongated instruments in the region located between input 13 and channels 21 and 22. Tongue 25 may be pivotally mounted on an arbour 26 which may be moulded together with plate 20 for example, an intermediate ball bearing 27, which could possibly be coated of Teflon (Registered Trademark) for example, being interposed between the tongue and the arbour to limit friction. An additional ball bearing 27 may be provided, facing tongue 25 on the other side of input 13 in order to furthermore limit friction in the direction to first channel 21.

Tongue 25 may have approximately a L-general shape, one branch 28 of which may bear a deflecting surface 29 designed to act on elongated instruments, while the other branch 30 may have a through hole 31 in which may be engaged a rod 32 of a command mechanism 33. The latter may be borne by a support 34 of plate 20.

Command mechanism 33 may comprise an arbour 35 carrying rod 32 and able to translate between at least a first and a second positions, for example in response to an action of an operator on input device 19. Translation of arbour 35 induces rotation of tongue 25 from a first to a second positions. Any suitable actuator known from prior art may be used to actuate arbour 35 without departing from the scope of the present invention.

In operation, tongue 25 is may be in the first position as represented on FIG. 2 when first elongated medical instrument 101 is inserted in simulation device 2. When a tip of the instrument hits deflecting surface 29, it may be guided into first channel 21 towards first output 23 of the bifurcating device.

When second elongated medical instrument 102 is inserted in simulation device 2, bifurcating device 15 may be activated, either automatically or manually through input device 19, so that tongue 25 may be pivoted to its second position. In this position, deflecting surface 29 may be set in alignment with input 13 of bifurcating device 14 so that when instrument 102 is pushed in bifurcating device 14 by an operator it goes straight forward from input 13 into second channel 22 of plate 20. Thus, second instrument 102 may go out from bifurcating device 14 through its second output 24.

First and second instruments 101, 102 may then be respectively guided to simulation mechanisms through first and second channels 16 and 17.

Consequently, first and second instruments 101, 102 may share a common path from input 10 of simulation device 2 until they respectively reach first and second channels 21, 22 of bifurcating device 14 rendering a more realistic feeling to an operator than the prior art simulation devices inasmuch as it corresponds more closely to a real intervention situation. As previously mentioned, the fact that the instruments are inserted into the simulation device through a same entry port further contributes to the realism of the simulation on the operator's side, from the instrument handling point of view.

Alternatively, one could provide that command mechanism 33 comprises a return spring (not represented) arranged in such a way that tongue 25, in its rest position, may be out of the path in the bifurcating device, i.e. that all output channels may be accessible. Once insertion of an elongated instrument in the simulation device would be detected, command mechanism could be controlled to actuate tongue 25 so that it would go to its position visible on FIG. 2. Detection of the insertion of a further instrument would then stop actuation of tongue 25 by command mechanism 33, the return spring acting on tongue 25 to make it return to its rest position. Additional intermediate steps would take place, corresponding to intermediate positions of tongue 25, in the case of more than two output channels.

It is important to note that the present invention is not limited to a bifurcating device comprising two different channels. Indeed, more than two channels may be provided, in association with an equal number of corresponding positions of tongue 25. However, two conditions should be fulfilled in order for the bifurcating device to operate properly: the last used path in the bifurcating device should be designed in a straight fashion between device input 13 and the last output channel and, the angle lying between deflecting surface 29 when tongue 25 is in its first position and the direction of the input channel should not be too large, as the more this angle, the more undesirable friction takes place between plate 20 and first instrument 101.

In addition, two or more bifurcating devices 14 could be connected in a cascade mode, by means of connecting one output channel to an input channel of a second similar bifurcation device.

Figure 3:
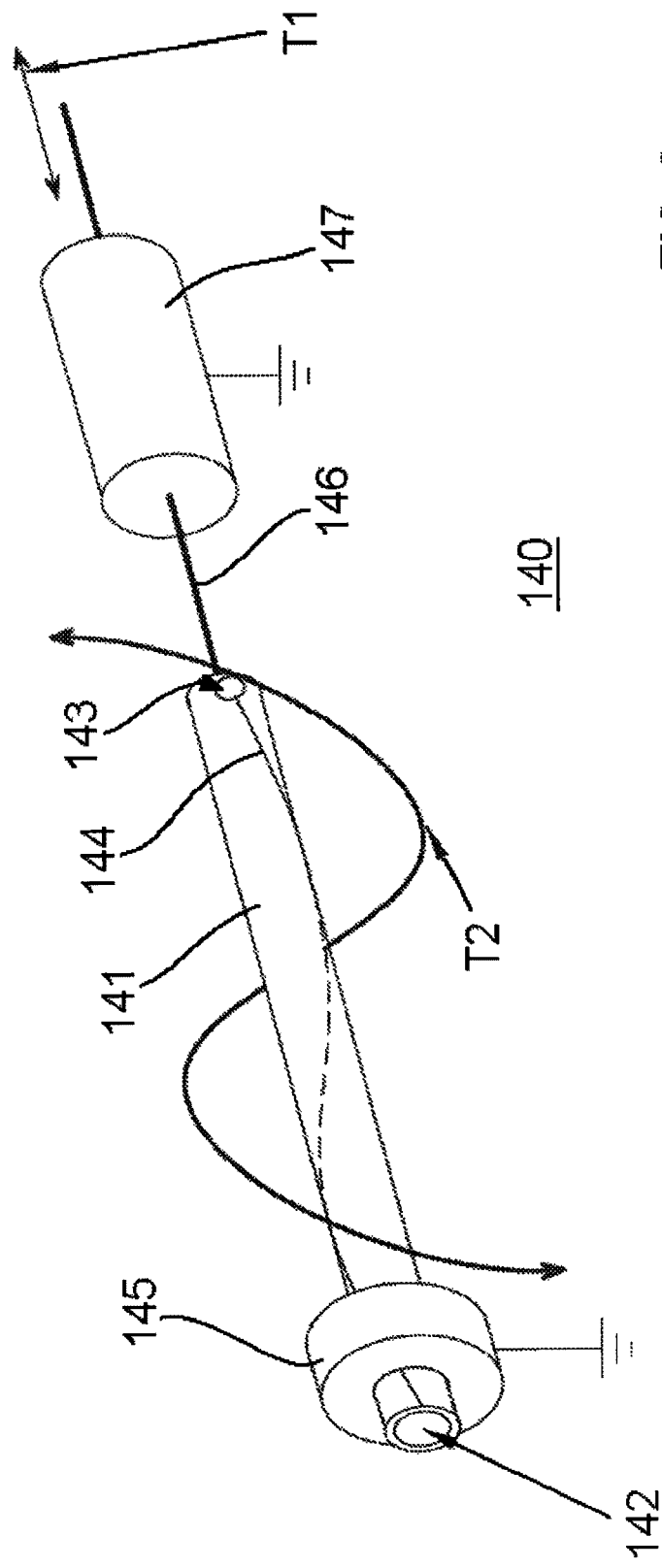
FIG. 3 is a perspective schematic view of a detail of the device of FIG. 1 according to a second embodiment.

FIG. 3 represents a perspective schematic view of a bifurcating device 140 according to an additional exemplary embodiment of the present invention.

Bifurcating device 140 may comprise a tube 141 having an instrument input 142 on the one side and an instrument output 143, in the form of a circular hole, on the other side. A helicoidal slit 144 may extend on the envelope of tube 141 between input 142 and output 143. An inclined abutment surface (not shown) may be provided at the inner end of tube 141, on the output side.

Tube 141 may be engaged inside a threaded nut 145 standing still with respect to the simulation device housing. In a preferred embodiment, the nut thread may correspond substantially to the shape of slit 144.

On its output 143 side, tube 141 may be firmly connected in its axial direction, while being free to rotate, to a shaft 146 driven in translation by an actuator 147 standing still with respect to the simulation device housing. Thus, when shaft 146 moves under the effect of actuator 147 (arrow T1), it may induce a rectilinear motion of the tube end which translates into a helicoidal motion of tube 141 and of its output 143 (arrow T2) by action of slit 144 on the nut thread.

Control means, which may be microcontroller 3, may be programmed so as to control operation of actuator 147 in such a way as to define at least two different positions of tube 141 with respect to the device housing. Thus, two corresponding positions of output 143 may be defined along the above-described helicoidal path.

Simulation device 2 may further comprise a plate (not shown), similar to plate 20 of the first embodiment, in which may be designed output channels, the respective ends of which are located in alignment with the predefined positions of output 143.

In operation, assuming that tube 141 may initially be in a pushed-in position, i.e. output 143 is in its nearest predefined position with respect to nut 145, a first elongated medical instrument 101 may be inserted into tube 141 through its input 142. When the end of instrument 101 abuts against the inclined abutment surface, it may be guided towards output 143 to go through the latter into a first output channel of the bifurcating device and then to a simulation mechanism 18.

Actuator 147 may then be controlled to drive shaft 146 in translation, inducing a motion of tube 141 until output 143 reaches its second predefined position, farther from nut 145 than its first predefined position and in alignment with a second channel output (not shown) of the simulation device. At the same time, first instrument may be extracted from output 143, in a substantially longitudinal direction with respect to tube 141, to travel along slit 144 while remaining still with respect to the simulation device housing.

As mentioned in connection with the first embodiment, actuator 147 may be activated either automatically or manually through input device 19.

Consequently, when a second elongated medical instrument 102 is inserted into tube 141 through its input 142, it may travel substantially straightforward until it abuts against the inclined abutment surface, where it may be guided towards output 143 to go through the latter into the second output channel of the bifurcating device and then, to another simulation mechanism 18.

It appears that, similarly to what have been described above in connection with the first embodiment, first and second instruments 101, 102 may share a common path from input 10 of simulation device 2 until they respectively reach first and second output channels of bifurcating device 140 rendering a more realistic feeling to an operator than the prior art simulation devices inasmuch as it corresponds more closely to a real intervention situation.

Here again, the present embodiment is not limited to the mentioned number of output channels of the simulation device, inasmuch as more than two predefined positions of output 143 may be provided without going beyond the subject-matter of the invention.

As far as either of the embodiments is concerned, it could be combined with a carriage system as described in the previously mentioned document of prior art (EP 1 576 566 A1) in a number of different fashions depending in particular on the relation eventually existing between the instruments. In the case of two adjacent instruments as described for example in connection with the embodiment of FIG. 1, a carriage may be provided in alignment with each of output channels 21 and 22 for further guiding separately each of the instruments in the simulation device.

Alternatively and without departing from the scope of the present invention, a bifurcating device as described above could be firmly connected to a first carriage, two or more additional carriages being eventually provided in alignment with each of the output channels of the bifurcating device. Such an embodiment would be suitable for manipulating several adjacent instruments arranged within a same catheter for example. Thus, the catheter would be guided by the first carriage while the bifurcating device would later separate the instruments from each other such that they would independently be guided by the corresponding carriages.

The above description corresponds to a preferred embodiment of the invention described by way of non-limiting example. In particular, the forms shown and described for the various component parts of bifurcating devices 14 and 140 are not limiting.

Further and by way of example, a person skilled in the art will encounter no particular problem in implementing alternative means to the motion sensors as referred to, without departing from the scope of the present invention. Indeed, one could provide that at least one of the first and second motion sensors comprises a light emitter as well as a light sensor arranged apart and facing the light emitter. Thus, both components would be arranged in the simulation device so that a shadow may be formed on the light sensor by introduction of an elongated medical instrument between it and the light emitter. Furthermore, identification of the nature of the elongated medical instrument may be carried out on the basis of the size of the formed shadow. Any suitable light emitter and sensor may be used for that purpose. The light sensor may comprise a pixel structure, identification of the instrument being thus carried out on the basis of the number of shadowed pixels in one predefined dimension, for example. A conventional calibration step may be implemented before using the simulation device by measuring the light noise level to be deduced from subsequent measured values.

A same optical sensor may be provided in the region of device input 10 to automatically actuate the bifurcating device when a second or further instrument is inserted.

One could also provide an arrangement in which both the light sensor and light emitter are arranged in a planar configuration, beside each other with an appropriate angle therebetween. In this arrangement, the amount of light reflected by an elongated medical instrument inserted underneath the light emitter and the light sensor may be used for the identification of the nature of the medical instrument.

The invention claimed is:

1. A simulation device, for practicing manipulations of at least one elongated medical instrument, comprising a housing presenting at least one instrument input and enclosing a first motion sensor for tracking the motions of a first elongated medical instrument inserted therein, said housing enclosing a bifurcating device having one input connected to said instrument input as well as at least a first and a second outputs and comprising a deflecting mechanism for guiding said first and a second elongated medical instruments from its input, respectively, through said first and second outputs, said first output being connected to said first motion sensor while said second output is connected to a second motion sensor for tracking the motions of said second elongated medical instrument.

2. The simulation device of claim 1, wherein said deflecting mechanism comprises a movable organ designed to take at least a first position and a second position with respect to said housing, such that said second output is inaccessible in the first position and accessible in the second position.

3. The simulation device of claim 2, wherein said bifurcating device includes a plate defining an input channel dividing into at least two output channels in the region of said deflecting mechanism.

4. The simulation device of claim 3, wherein said deflecting mechanism includes a tongue mounted on said plate so as to be able to pivot between at least a first position and a second position.

5. The simulation device of claim 2, said bifurcating device being a first bifurcating device, wherein the simulation device comprises at least one additional similar bifurcating device connected in a cascade mode with said first bifurcating device such that the simulation device comprises an instrument input connected with any of said output channels of said first bifurcating device.

6. The simulation device of claim 1, wherein said deflecting mechanism comprises a movable organ designed to take at least a first position and a second position with respect to said housing, such that said bifurcating device input is connected to said first output in the first position and to said second output in the second position.

7. The simulation device of claim 6, wherein said bifurcating device includes a plate defining an input channel dividing into at least two output channels in the region of said deflecting mechanism.

8. The simulation device of claim 7, wherein said deflecting mechanism includes a tongue mounted on said plate so as to be able to pivot between at least a first position and a second position.

9. The simulation device of claim 6, said bifurcating device being a first bifurcating device, wherein the simulation device comprises at least one additional similar bifurcating device connected in a cascade mode with said first bifurcating device such that the simulation device comprises an instrument input connected with any of said output channels of said first bifurcating device.

10. The simulation device of claim 1, wherein said bifurcating device includes a plate defining an input channel dividing into at least two output channels in the region of said deflecting mechanism.

11. The simulation device of claim 10, wherein said deflecting mechanism includes a tongue mounted on said plate so as to be able to pivot between at least a first position and a second position.

12. The simulation device of claim 11, said bifurcating device being a first bifurcating device, wherein the simulation device comprises at least one additional similar bifurcating device connected in a cascade mode with said first bifurcating device such that the simulation device comprises an instrument input connected with any of said output channels of said first bifurcating device.

13. The simulation device of claim 10, said bifurcating device being a first bifurcating device, wherein the simulation device comprises at least one additional similar bifurcating device connected in a cascade mode with said first bifurcating device such that the simulation device comprises an instrument input connected with any of said output channels of said first bifurcating device.

14. The simulation device of claim 10, wherein said first and second motion sensors are friction-free motion sensors, each comprising an optical navigation sensor.

15. The simulation device of claim 1, said bifurcating device being a first bifurcating device, wherein the simulation device comprises at least one additional similar bifurcating device connected in a cascade mode with said first bifurcating device such that the simulation device comprises an instrument input connected with any of said output channels of said first bifurcating device.

16. The simulation device of claim 15, wherein said first and second motion sensors are friction-free motion sensors, each comprising an optical navigation sensor.

17. The simulation device of claim 1, wherein said first and second motion sensors are friction-free motion sensors, each comprising an optical navigation sensor.

18. The simulation device of claim 1, wherein at least one of said first and second motion sensors comprises a light emitter as well as a light sensor arranged apart and facing said light emitter, the light emitter and the light sensor being arranged in the simulation device so that a shadow may be formed on said light sensor by introduction of an elongated medical instrument between the light sensor and said light emitter.

19. The simulation device of claim 1, further comprising at least a first braking mechanism arranged to be operated in response to a braking signal produced by a control unit, and act on either of said elongated medical instruments, on the basis of a motion information provided by the corresponding motion sensor, said braking mechanism being intended to provide a user of the simulation device with haptic sensations on the basis of said elongated medical instrument motion.

20. The simulation device of claim 19, further comprising a second braking mechanism arranged to be operated in response to a braking signal produced by a control unit, and act on the other of said elongated medical instruments, on the basis of a motion information provided by the corresponding motion sensor, said braking mechanism being intended to provide a user of the simulation device with haptic sensations on the basis of said elongated medical instrument motion.

* * * * *